United States Patent
Fritz et al.

(10) Patent No.: US 11,318,941 B2
(45) Date of Patent: May 3, 2022

(54) WORKING COMBINATION ENCOMPASSING AN EARTH WORKING MACHINE AND A FURTHER VEHICLE, AND AN AUTOMATIC SPACING MONITORING SYSTEM

(71) Applicant: Wirtgen GmbH, Windhagen (DE)

(72) Inventors: Matthias Fritz, Hennef (DE); Herbert Lange, Overath (DE); Marc Pees, Niederbreitbach (DE); Carmen Kania, Ruppichteroth (DE)

(73) Assignee: Wirtgen GmbH

( * ) Notice: Subject to any disclaimer, the term of this patent is extended or adjusted under 35 U.S.C. 154(b) by 169 days.

(21) Appl. No.: 16/791,015

(22) Filed: Feb. 14, 2020

(65) Prior Publication Data

US 2020/0262428 A1 Aug. 20, 2020

(30) Foreign Application Priority Data

Feb. 19, 2019 (DE) .................... 10 2019 104 218.6

(51) Int. Cl.
*B60W 30/165* (2020.01)
*B60W 10/04* (2006.01)
(Continued)

(52) U.S. Cl.
CPC .......... *B60W 30/165* (2013.01); *B60W 10/04* (2013.01); *B60W 10/18* (2013.01);
(Continued)

(58) Field of Classification Search
CPC .... B60W 30/165; B60W 10/04; B60W 10/18; B60W 2554/802; B60W 2300/17;
(Continued)

(56) References Cited

U.S. PATENT DOCUMENTS 3,608,968 A  9/1971 Burnett
4,221,434 A  9/1980 Swisher et al.
(Continued)

FOREIGN PATENT DOCUMENTS

AU  2008201640 A1  11/2008
AU  2015215954 A1  3/2016
(Continued)

OTHER PUBLICATIONS

EP Search Report for corresponding patent application EP 20 15 7903, dated Jul. 22, 2020, 7 pages (not prior art).
(Continued)

*Primary Examiner* — B M M Hannan
(74) *Attorney, Agent, or Firm* — Lucian Wayne Beavers; Gary L. Montle; Patterson Intellectual Property Law, PC (57) ABSTRACT

A system is provided for monitoring spacing during working operation between a first vehicle and at least one further self-propelled vehicle. A beam source is on one vehicle (source vehicle). A sensor arrangement on another vehicle (target vehicle) extends along a sensor axis. In a predetermined reference state, with the vehicles having a predetermined reference spacing apart, the beam source radiates toward the target vehicle electromagnetic radiation such that a predetermined sensor-axial reference detection region on the sensor arrangement is irradiated by the beam source. A change in the vehicle spacing results in a change, along the sensor axis, in the position of the detection region on the irradiated sensor arrangement, and thus in a change in the detection state of the sensor arrangement. Based on the detection state which depends on an actual spacing of the source and target vehicles, a spacing signal is generated with vehicle spacing information.

20 Claims, 6 Drawing Sheets

(51) Int. Cl.
*B60W 10/18* (2012.01)
*E01C 23/06* (2006.01)

(52) U.S. Cl.
CPC ...... *B60T 2201/02* (2013.01); *B60W 2300/17* (2013.01); *B60W 2510/06* (2013.01); *B60W 2510/18* (2013.01); *B60W 2520/10* (2013.01); *B60W 2520/14* (2013.01); *B60W 2520/16* (2013.01); *B60W 2554/802* (2020.02); *E01C 23/065* (2013.01)

(58) Field of Classification Search
CPC ......... B60W 2510/06; B60W 2510/18; B60W 2520/10; B60W 2520/14; B60W 2520/16; B60T 2201/02; E01C 23/065; E01C 19/004; E01C 19/48; E01C 2301/04; E01C 23/088; E01C 19/00; E01C 19/006; E01C 19/4886; E01C 21/00; G05D 1/024; G05D 1/0259; G05D 2201/0202; G05D 1/0293; H04W 4/46; H04W 4/38
USPC .......................................................... 701/50
See application file for complete search history.

(56) References Cited

U.S. PATENT DOCUMENTS

| | | |
|---|---|---|
| 4,376,609 A | 3/1983 | Bohman et al. |
| 4,647,248 A | 3/1987 | Wirtgen |
| 4,863,009 A | 9/1989 | Winkel et al. |
| 5,178,253 A | 1/1993 | Fix |
| 5,575,316 A | 11/1996 | Pollklas |
| 5,749,783 A | 5/1998 | Pollklas |
| 5,857,274 A | 1/1999 | Rudiger et al. |
| 5,893,677 A | 4/1999 | Haehn et al. |
| 6,247,510 B1 | 6/2001 | Diekhans et al. |
| 6,336,684 B1 | 1/2002 | Turner |
| 6,366,684 B1 | 4/2002 | Gerard et al. |
| 6,457,779 B1 | 10/2002 | Busley et al. |
| 6,682,416 B2 | 1/2004 | Behnke et al. |
| 6,718,746 B2 | 4/2004 | Hettiger et al. |
| 6,943,824 B2 | 9/2005 | Alexia et al. |
| 7,831,345 B2 | 11/2010 | Heino et al. |
| 7,918,512 B2 | 4/2011 | Mannebach et al. |
| 7,976,239 B2 | 7/2011 | Hall et al. |
| 8,337,118 B2 | 12/2012 | Buschmann et al. |
| 8,348,044 B2 | 1/2013 | Tebbe et al. |
| 8,485,755 B2 | 7/2013 | Menzenbach et al. |
| 8,499,537 B2 | 8/2013 | Correns et al. |
| 8,511,933 B2 | 8/2013 | Menzenbach et al. |
| 8,528,988 B2 | 9/2013 | Von Schönebeck et al. |
| 8,590,983 B2 | 11/2013 | Berning et al. |
| 8,665,454 B2 | 3/2014 | Fowler et al. |
| 8,690,474 B2 | 4/2014 | Jurasz et al. |
| 8,764,341 B2 | 7/2014 | Menzenbach et al. |
| 8,770,386 B2 | 7/2014 | Berning et al. |
| 8,979,424 B2 | 3/2015 | Berning et al. |
| 8,996,172 B2 | 3/2015 | Shah et al. |
| 9,121,145 B2 | 9/2015 | Berning et al. |
| 9,126,776 B2 | 9/2015 | Von Schönebeck et al. |
| 9,133,587 B2 | 9/2015 | Berning et al. |
| 9,181,664 B2 | 11/2015 | Berning et al. |
| 9,267,249 B2 | 2/2016 | Simon |
| 9,328,467 B2 | 5/2016 | Forster et al. |
| 9,562,334 B2 | 2/2017 | Von der Lippe et al. |
| 9,764,910 B2 | 9/2017 | Berning et al. |
| 9,809,937 B2 | 11/2017 | Berning et al. |
| 9,873,993 B2 | 1/2018 | Berning et al. |
| 9,879,386 B2 | 1/2018 | Marsolek |
| 10,001,187 B2 | 6/2018 | Zahr |
| 10,208,436 B2 | 2/2019 | Kötting et al. |
| 2003/0174207 A1 | 9/2003 | Alexia et al. |
| 2005/0179309 A1 | 8/2005 | Berning et al. |
| 2005/0207841 A1 | 9/2005 | Holl et al. |
| 2006/0045621 A1 | 3/2006 | Potts et al. |
| 2006/0094487 A1 | 5/2006 | Huster et al. |
| 2006/0150584 A1* | 7/2006 | Weiss .................. A01B 69/008 54/10 |
| 2007/0122235 A1* | 5/2007 | Kasahara .............. E01C 23/065 404/75 |
| 2007/0122236 A1 | 5/2007 | Gaertner et al. |
| 2008/0153402 A1 | 6/2008 | Arcona et al. |
| 2008/0173740 A1 | 7/2008 | Parker et al. |
| 2008/0245042 A1 | 10/2008 | Brunnert et al. |
| 2008/0258535 A1 | 10/2008 | Berning et al. |
| 2009/0044505 A1 | 2/2009 | Huster et al. |
| 2009/0229233 A1 | 9/2009 | Pollklas et al. |
| 2009/0245462 A1* | 10/2009 | Agrawal ................ G01N 23/04 378/57 |
| 2009/0267402 A1 | 10/2009 | Berning et al. |
| 2010/0014917 A1 | 1/2010 | Willis et al. |
| 2010/0063692 A1 | 3/2010 | Madsen et al. |
| 2010/0070144 A1 | 3/2010 | Burke et al. |
| 2010/0296867 A1 | 11/2010 | Buschmann et al. |
| 2011/0022273 A1* | 1/2011 | Peters .................. G05D 1/0293 701/42 |
| 2011/0061762 A1 | 3/2011 | Madsen et al. |
| 2011/0064274 A1 | 3/2011 | Madsen et al. |
| 2011/0080034 A1 | 4/2011 | Schönebeck et al. |
| 2011/0123268 A1 | 5/2011 | Berning et al. |
| 2011/0213531 A1 | 9/2011 | Farley et al. |
| 2011/0307149 A1 | 12/2011 | Pighi et al. |
| 2012/0263560 A1 | 10/2012 | Diekhans et al. |
| 2013/0076101 A1 | 3/2013 | Simon |
| 2013/0080000 A1 | 3/2013 | Von der Lippe et al. |
| 2013/0227922 A1 | 9/2013 | Zametzer et al. |
| 2013/0269832 A1 | 10/2013 | Gengerke |
| 2013/0322963 A1 | 12/2013 | Forster et al. |
| 2013/0341997 A1 | 12/2013 | Franzmann et al. |
| 2014/0054949 A1 | 2/2014 | Berning et al. |
| 2014/0077579 A1 | 3/2014 | Berning et al. |
| 2014/0084665 A1 | 3/2014 | Motz et al. |
| 2015/0091364 A1 | 4/2015 | Kötting et al. |
| 2015/0218762 A1* | 8/2015 | Berning ................ E01C 23/127 299/1.9 |
| 2015/0305239 A1* | 10/2015 | Jung .................... A01D 41/141 701/50 |
| 2015/0307911 A1 | 10/2015 | Urthaler et al. |
| 2016/0052731 A1 | 2/2016 | Berning et al. |
| 2016/0060827 A1 | 3/2016 | Berning et al. |
| 2016/0160454 A1 | 6/2016 | Berning et al. |
| 2016/0194840 A1 | 7/2016 | Berning et al. |
| 2016/0208447 A1 | 7/2016 | Berning et al. |
| 2017/0009408 A1 | 1/2017 | Marsolek et al. |
| 2018/0119370 A1 | 5/2018 | Berning et al. |
| 2018/0142427 A1 | 5/2018 | Tkachenko et al. |
| 2018/0202116 A1 | 7/2018 | Berning et al. |
| 2018/0258596 A1 | 9/2018 | Berning et al. |
| 2019/0061623 A1 | 2/2019 | Borkowski |
| 2019/0376258 A1* | 12/2019 | Rivard .................. E02F 7/02 |

FOREIGN PATENT DOCUMENTS

| | | |
|---|---|---|
| CN | 101809461 A | 8/2010 |
| CN | 101892623 A | 11/2010 |
| CN | 102465486 A | 5/2012 |
| CN | 103282583 A | 9/2013 |
| CN | 103397884 A | 11/2013 |
| CN | 103628397 A | 3/2014 |
| CN | 103628398 A | 3/2014 |
| CN | 203654144 U | 6/2014 |
| CN | 203700926 U | 7/2014 |
| CN | 103988050 A | 8/2014 |
| CN | 105735093 A | 7/2016 |
| CN | 105386395 B | 8/2017 |
| CN | 108368682 A | 8/2018 |
| CN | 108473260 A | 8/2018 |
| DE | 155157 A1 | 5/1982 |
| DE | 3843480 A1 | 3/1990 |
| DE | 19628420 A1 | 1/1998 |
| DE | 102005035480 A1 | 2/2007 |
| DE | 202007005756 U1 | 10/2008 |
| DE | 102009041842 A1 | 9/2011 |

(56) References Cited

FOREIGN PATENT DOCUMENTS

| | | |
|---|---|---|
| DE | 102010050831 A1 | 5/2012 |
| DE | 102012215005 A1 | 2/2014 |
| DE | 102012215013 A1 | 2/2014 |
| DE | 102013009361 A1 | 12/2014 |
| DE | 102014216713 A1 | 2/2016 |
| DE | 102014216763 A1 | 2/2016 |
| EA | 22806 B1 | 3/2016 |
| EP | 245544 A2 | 11/1987 |
| EP | 666018 A1 | 8/1995 |
| EP | 1344445 A1 | 9/2003 |
| EP | 1574122 A1 | 9/2005 |
| EP | 2025812 A2 | 2/2009 |
| EP | 2100495 A1 | 9/2009 |
| EP | 2218823 A2 | 8/2010 |
| EP | 2301318 A1 | 3/2011 |
| EP | 2452551 A2 | 5/2012 |
| EP | 2573266 A2 | 3/2013 |
| EP | 2573267 A1 | 3/2013 |
| EP | 2700748 A1 | 2/2014 |
| EP | 2987911 A1 | 2/2016 |
| JP | 61257118 A | 11/1986 |
| JP | 09086672 A | 3/1997 |
| JP | 11050415 A | 2/1999 |
| JP | 2002510000 A | 4/2002 |
| JP | 2008163734 A | 7/2008 |
| JP | 2008202396 A | 9/2008 |
| JP | 2009263136 A | 11/2009 |
| RU | 2394122 C1 | 7/2010 |
| RU | 2611802 C2 | 3/2017 |
| WO | 9624725 A1 | 8/1996 |
| WO | 2005054578 A1 | 6/2005 |
| WO | 2009098294 A2 | 8/2009 |
| WO | 2012016573 A1 | 2/2012 |
| WO | 2012062456 A1 | 5/2012 |
| WO | 2014029824 A1 | 2/2014 |
| WO | 2017125607 A1 | 7/2017 |

OTHER PUBLICATIONS

China Office Action for corresponding patent application No. CN 202010098727.3, dated Apr. 30, 2021, 6 pages (not prior art).

\* cited by examiner

WORKING COMBINATION ENCOMPASSING AN EARTH WORKING MACHINE AND A FURTHER VEHICLE, AND AN AUTOMATIC SPACING MONITORING SYSTEM

CROSS-REFERENCES TO RELATED APPLICATIONS

This application claims benefit of German Patent Application No. 10 2019 104 218.6, filed Feb. 19, 2019, and which is hereby incorporated by reference.

BACKGROUND

The present invention relates to a working combination encompassing a self-propelled earth working machine constituting a first vehicle and at least one further self-propelled vehicle, the vehicles of the working combination being embodied to move, during working operation as intended, one behind another in a common working direction with a setpoint spacing that is within a predetermined setpoint spacing value range; the working combination having a spacing monitoring device that, on the basis of a detection state of the spacing monitoring device which depends on an actual true spacing of the vehicles, outputs a spacing signal that contains information regarding the vehicle spacing; the spacing monitoring device comprising a beam source emitting electromagnetic radiation and a sensor arrangement sensitive to the electromagnetic radiation of the beam source; one vehicle from among the first and the further vehicle, constituting a source vehicle, carrying the beam source; when the working combination is in a predetermined reference state, i.e. on a flat horizontal substrate with vehicles arranged in readiness for working operation with a predetermined reference spacing from one another, the beam source radiating, toward the respective other vehicle from among the first and the further vehicle constituting a target vehicle, an electromagnetic radiation directed in such a way that the electromagnetic radiation for spacing monitoring is present only in a beam space that extends over a first angular region around a first beam space axis and over a second angular region around a second beam space axis that encloses an angle with the first beam space axis; the second angular region being of equal magnitude to, or of greater magnitude than, the first angular region; and the beam space being inclined around the first beam space axis with reference to the working direction.

Figure 6:
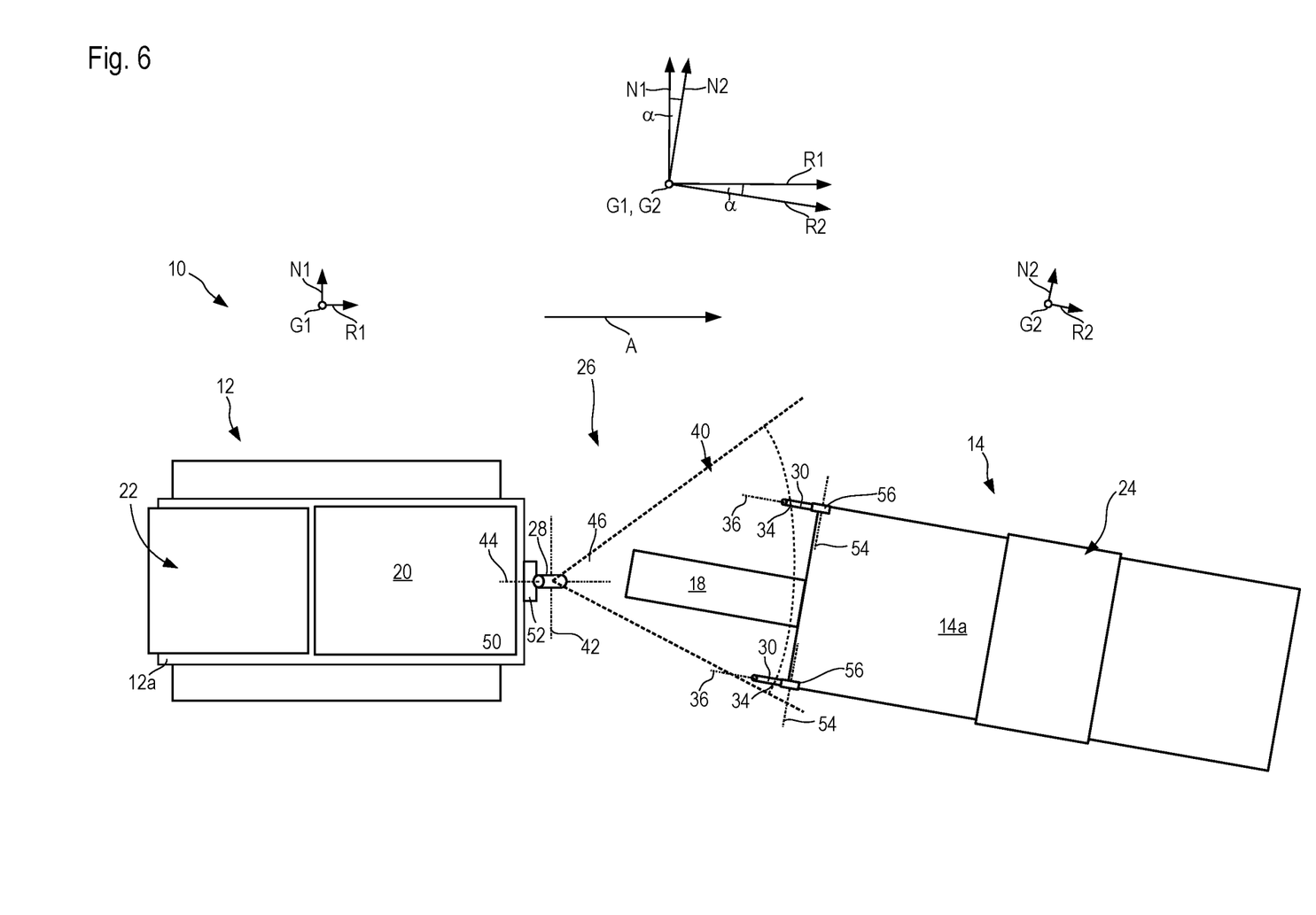
FIG. 6 shows the working combination of FIG. 5 after entering a right-hand turn.

A working combination of this kind is known from US 2018/0142427 A1, in particular from FIG. 6 thereof. The earth working machine therein is a paving machine, also referred to below as simply a "paver." The further vehicle is a supply vehicle that loads asphalt into the paver during operation thereof.

Arranged on the known supply vehicle is an LED light source that emits light to the paver in a beam space that is vertically narrow (not exceeding an aperture angle of 6°) and extends horizontally approximately over the width of the paver.

Light of the LED light source which is reflected from the paver is detected by a sensor arrangement on the supply vehicle. The magnitude of the spacing between the supply vehicle and the paver is calculated from the transit time of the light from the LED source to the paver and back to the sensor arrangement, and a spacing signal containing that spacing information is outputted at the supply vehicle in order to control the motion of the working combination.

This working combination is disadvantageous on the one hand because of the large outlay required for implementation of the spacing measurement. Specifically, a surface on the supply vehicle which is maximally flat and orthogonal to the spacing direction between the paver and supply vehicle must be irradiated, since projecting and recessed structures, as well as differently inclined surface regions, on the irradiated region of the paver can cause undesired signal interference or can produce "noise" in the reflected light required for transit time determination.

On the other hand, in order for transit times to be detectable at all, complexly modulated light must be emitted from the known LED light source so as to ascertain transit times of the light.

Specifically in a very dirty construction-site environment with additional thermal stress (including alternating stress) on the vehicles that are part of the working combination, an approach to spacing monitoring of the vehicles of the working combination which is less complex and therefore more robust, but ultimately functions at least as accurately, is therefore desirable.

BRIEF SUMMARY

An object of the present invention is therefore to further develop a working combination of the kind recited initially in such a way that the spacing to be maintained between the vehicles thereof can be monitored with simple, interference-insensitive means. A further intention is that the spacing be capable of being maintained with no mechanical/physical coupling of the vehicles.

The present invention achieves this object with a working combination as described at the beginning of the present Application, in which additionally the sensor arrangement extends along a sensor axis and is arranged on the target vehicle to be carried by it; when considering the working combination in the reference state, a predetermined sensor-axial reference detection region on the sensor arrangement being irradiated by the beam source; and the sensor axis being arranged with an inclination, i.e. in non-parallel fashion, around an inclination axis parallel to the first beam space axis, relative to a connecting line between the detection region and the beam source, so that a change in the vehicle spacing results in a change, along the sensor axis, in the position of the detection region on the sensor arrangement which is irradiated by the beam source, and thus in a change in the detection state of the sensor arrangement. The sensor axis can be, but does not need to be, inclined around a further axis.

Detection by the sensor arrangement of the electromagnetic radiation emitted from the beam source occurs preferably in the direct beam path, i.e. without previous reflection at a vehicle surface. As a result of the aforementioned inclinations both of the beam space and of the sensor arrangement that, in the reference state, is located at least in portions in the beam space, a change in the spacing between the vehicles of the working combination out of the reference state (or any other initial state) results in a displacement of the detection region of the sensor arrangement, which is irradiated by the beam source, along the sensor axis of said arrangement. This change is direction-sensitive, i.e. proceeding from an initially irradiated detection region it occurs always in the same direction on the sensor arrangement upon a shortening of the vehicle spacing, and always in the same opposite direction upon an increase in the vehicle spacing.

Upon initial setup of a working combination, in which context the beam source in the reference state irradiates a predetermined detection region of the sensor arrangement while preferably a dark region of the sensor arrangement, located sensor-axially on at least one side of the irradiated detection region, is not irradiated, spacing can be (and preferably is) monitored without quantitative calculation of the spacing, based solely on the location of the irradiated detection region on the sensor arrangement relative to a reference location.

The term "sensor-axial" expresses the fact that the adjective "axial" refers to the sensor axis. It is equivalent in meaning to "along the sensor axis."

In the reference state, preferably one dark region of the sensor arrangement is preferably present on each side of the irradiated detection region, so that upon a change in the spacing in both directions proceeding from the reference state, the detection region can irradiate a previously unirradiated region of the sensor arrangement, and then preferably no longer irradiates a previously irradiated region. In the reference state the sensor arrangement therefore preferably passes completely through the beam space and projects from it on both sides in a passthrough direction, i.e. along its sensor axis.

Also preferably, the sensor arrangement can comprise, successively sensor-axially, a plurality of sensor elements sensitive to the electromagnetic radiation of the beam source, so that depending on the sensor-axial position of the detection region, different sensor elements are irradiated with the electromagnetic radiation of the beam source, or not irradiated if they are located in the dark region of the respective detection state.

The reference state is preferably located in the setpoint spacing value range, particularly preferably with a respective spacing, preferably the same spacing, from the two edges of the setpoint spacing value range.

In terms of the dimensioning of the spacing, the reference points on the two vehicles of the working combination which are used as the basis for determining the spacing are in principle immaterial, as long as the spacing is always determined based on the same reference points for a given working combination.

The working direction is thus also the spacing direction, at least in a context of straight-line travel together. If the two vehicles of the working combination are moving locally in different spatial directions, for example when turning or when traveling over a bump or through a dip, in case of doubt the working direction is the shortest connection between the reference points for determining the spacing when traveling straight ahead. The two reference points are at the same height above the substrate on which the vehicles of the working combination are moving, so that in a reference state in which the working combination is supported at a predetermined reference spacing above a flat substrate, the working direction proceeds parallel to the support plane of the substrate.

Because the substrate on which the working combination is supported can be worked at least by the first vehicle, more than one support plane can exist along the working combination. This applies all the more so given that the further vehicle can also be an earth working machine. In doubtful cases, if the substrate or its support surface is serving as a reference magnitude, the substrate and the support surface defined by it are the substrate, or the surface defined by it, located between the vehicles in a working direction.

In principle, the above-described spacing monitoring system already functions with a single beam source on the source vehicle and a single sensor arrangement on the target vehicle of the working combination. More accurate and more meaningful information regarding the spacing between the vehicles of the working combination can be obtained, however, if the target vehicle comprises at least two sensor arrangements that each extend along a sensor axis. In this case each sensor axis of a sensor arrangement (considering the working combination in the reference state) is arranged with an inclination, relative to a connecting line between the detection region and the beam source, around an inclination axis parallel to the first beam space axis. In this case the detection state of several arrangements, preferably of all sensor arrangements, changes upon a change in the spacing between the source vehicle and target vehicle. The at least two sensor arrangements are then preferably arranged with a spacing from one another in a circumferential direction around the second beam space axis. The extent of the beam space along the second angular region serves to irradiate or illuminate the largest possible angular region with the radiation of the beam source, so that in this maximally large second angular region, one respective sensor arrangement can be arranged on the target vehicle at points located comparatively far apart from one another. The second angular region is therefore preferably larger than the first angular region.

The result of a maximally large distance between at least two sensor arrangements is that in addition to achievement of detection redundancy, signals of the respective sensor arrangements can also be utilized in order to distinguish changes in detection states which, in the absence of an actual change in spacing, are attributable only to a change in the relative orientation of the vehicles of the working combination, from changes in the detection state which are based on actual changes in spacing. The information content of the spacing signal of the spacing monitoring device is thereby increased.

In principle, the electromagnetic radiation of the beam source can be any radiation, as long as it can be limited with sufficient intensity to a relatively small first angular region. A first angular region of this kind is preferably no larger than 3° around the first beam space axis. An almost universally available electromagnetic radiation, which at the same time is highly accurate because it can be greatly limited in location, is emitted as laser light from a laser beam source. A laser beam source is therefore preferred as the aforementioned beam source. A laser beam source can emit coherent light over several tens of meters and can thus also generate only a single spot of light over several tens of meters. The setpoint spacing value range, defined as a clear spacing between the vehicles of the working combination, as a rule seldom or never exceeds spacing values of 20 meters.

The first angular region is preferably limited only to the extent of the laser beam emitted by the laser beam source constituting a preferred beam source. In this case the first angular region is considerably smaller than 3°.

The second angular region can be generated so as to sweep over a maximally large region on the target vehicle by targeted alignment of the laser beam emitted from the beam source, or of the emitted electromagnetic radiation. For that purpose, the beam source can emit a laser beam that oscillates or rotates around the second beam space axis. In the interest of industrial safety, a rotating laser beam can be occluded in peripheral regions around the second beam space axis in which target-vehicle irradiation definitely will not occur, in order to protect persons working at the construction site in the vicinity of the working combination from irradiation with the electromagnetic radiation, in particular the laser beam.

Many vehicles are taller than they are wide, or in other words have a greater extent along their yaw axis than along their pitch axis. Specifically in the context of earth working, however, it is not desirable to arrange a sensitive sensor arrangement in the vicinity of the substrate. The sensor arrangement is preferably arranged on the target vehicle at a distance from the substrate. This also applies to the case in which more than one sensor arrangement is provided on the target vehicle. An advantageous arrangement of a sensor arrangement, in particular of several sensor arrangements, in a direction parallel to the yaw axis with a spacing from the substrate of the target vehicle, simultaneously with great freedom in the arrangement of the at least one sensor arrangement in a direction parallel to the yaw axis on the target vehicle, can be enabled by the fact that the first beam space axis is parallel to the pitch axis of the source vehicle and/or that the second beam space axis is located in, or parallel to, a plane spanned by the yaw axis and the roll axis of the source vehicle.

The second beam space axis can be parallel to the yaw axis; a laser beam proceeding from a preferred rotating or oscillating laser beam source will then describe a conical enveloping surface or a partial conical enveloping surface. Or the second beam space axis is inclined with respect both to the yaw axis and to the roll axis; the beam space can then, particularly preferably, be a plane spanned by the laser beam or, in the case of an oscillating laser beam, a flat sector. The term "plane" is not to be understood here in the purely mathematical sense. The plane described here has an extent, orthogonally to its flat surface, which corresponds to the thickness of the laser beam. Advantageously, a change in the detection state can be reliably detected when the sensor axis of at least one sensor arrangement has, in a Cartesian vehicle coordinate system made up of a roll axis, a pitch axis, and a yaw axis, a greater extent component parallel to the plane spanned by the yaw axis and the roll axis of the target vehicle than orthogonally thereto.

The sensor arrangement is preferably parallel to the plane spanned by the yaw axis and the roll axis of the target vehicle. Additionally or alternatively, the at least one sensor arrangement, preferably each sensor arrangement, can be arranged with its sensor axis oriented orthogonally to a spacing line between the sensor arrangement and the beam source. In this case the sensor arrangement has high sensitivity in the event of a change in spacing, along with a large sensing region.

In order to simplify alignment of the spacing monitoring device, the beam source and/or the at least one sensor arrangement preferably is arranged respectively on the source vehicle or on the target vehicle movably relative to a vehicle body of the respective vehicle carrying it.

It can sometimes be the case that the setpoint spacing and/or the setpoint spacing value range between the source vehicle and target vehicle changes during working operation, for example because one of the two vehicles from among the source vehicle and target vehicle is replaced with a vehicle of identical function but of different physical construction. It is advantageous in such a case if the respective vehicle operator, or the only vehicle operator in the case of an automated spacing regulation system, does not need to leave his or her operator's platform in order to set up the spacing monitoring device for the new operating situation. According to an advantageous refinement of the present invention, provision can be made for that purpose that the source vehicle comprises a source actuator and/or the target vehicle comprises a sensor actuator, the source actuator being coupled motion-transferringly to the beam source and/or the sensor actuator being coupled motion-transferringly to the sensor arrangement, so that the beam source and/or the at least one sensor arrangement is or are received, on the respective vehicle carrying them, displaceably in actuator-based fashion relative to the respective vehicle body, around an adjustment axis parallel to the first beam space axis. One or both aforesaid actuators can additionally be displaceable around a further adjustment axis.

The working combination is described in the present Application in the reference state unless otherwise expressly indicated, i.e. the two vehicles of the working combination are located successively to one another in a working direction on a flat horizontal substrate. Their yaw axes are parallel, as are their pitch axes. The roll axes of the two vehicles, which extend parallel to the working direction, are parallel or collinear in the reference state.

Depending on the attachment locations of the beam source on the one hand and the sensor arrangement on the other hand, a change in the operating state of the working combination proceeding from the reference state, for example due to a turning maneuver by the working combination, can result in a change in the detection state of the spacing monitoring device even though the spacing between the vehicles of the working combination does not actually change. In order to reduce the probability of incorrect detection or incorrect assessment of the detection state of the spacing monitoring device, according to a refinement of the present invention provision can be made that the spacing monitoring device comprises a control device; and that the first and/or the further vehicle comprises a yaw angle detection apparatus that detects a yaw angle of the respective vehicle, at least one yaw angle detection apparatus transferring to the control device a yaw angle signal that contains information regarding the yaw angle of at least one vehicle; the control device generating the spacing signal in accordance with the detection state of the at least one sensor arrangement and in accordance with the yaw angle signal of the at least one yaw angle detection apparatus.

The yaw angle detection apparatus can detect the information regarding the yaw angle of at least one vehicle in any manner, for example by way of a GPS system or by way of corresponding sensors that are also used, for example, in mobile telephones in order to ascertain their spatial orientation. In addition or alternatively to a yaw angle sensor that directly detects the yaw angle, the yaw angle of a vehicle can be detected indirectly by detecting the steering angle and the distance traveled by the vehicle, and/or the vehicle speed over a common time period.

Each vehicle of the working combination preferably comprises a yaw angle detection apparatus, so that a relative yaw angle of the two vehicles relative to one another can be detected directly and exactly by data communication between the two vehicles.

It is also possible, however, for only one vehicle to comprise a yaw angle detection apparatus. That vehicle is then preferably the one preceding in a working direction. If the working combination begins working operation in the reference state, or in a defined known state with a known mutual relative orientation of the vehicles of the working combination, at least one vehicle of the working combination, preferably once again the vehicle preceding in a working direction, can ascertain, based on the travel speed of the vehicle preceding in a working direction and based on spacing information from the spacing monitoring device, on the reasonable assumption that the yaw angle of the trailing vehicle will change locally along the working distance in the same way as the yaw angle of the preceding vehicle, a time-related and/or positional offset between a yaw angle change of the preceding vehicle and of the trailing vehicle. This time-related and/or positional offset can be taken into account by the control device when evaluating the detection state in order to generate the spacing signal.

The control device advantageously comprises an input apparatus with which data are inputtable into the control device and thus into the spacing monitoring device. The input apparatus can encompass a keyboard, mouse, touchscreen, microphone, and the like. With this input apparatus it is possible, for example, to input a spacing value associated with the reference state in a predefined or selectable unit of measurement, so that based on the speed information of one of the vehicles and based on the spacing value, the time-related and/or positional offset of yaw angle changes between the two vehicles of the working combination can be calculated.

It is also possible to input into the control device, by way of the input apparatus, the change in spacing between the vehicles which corresponds to a predetermined positional change in the detection region of the electromagnetic radiation on the sensor arrangement. Assuming a stationary orientation of the sensor arrangement and the beam source, this information can also be stored in a data memory of the control device. For an orientation of the sensor arrangement and beam source which is ascertainable from certain positions of the source actuators and/or sensor actuators, this information can also be ascertainable in consideration of data stored in a data memory for different orientations.

What is applicable to the relative change in vehicle orientation proceeding from the reference state, around a change axis parallel to the yaw axis, in a turning maneuver, can additionally or alternatively also apply to a change in the relative orientation of the two vehicles around a change axis parallel to the pitch axis, when traveling over a terrain elevation or through a terrain depression. According to an advantageous refinement of the present invention, provision can be made for this purpose, in order to increase detection accuracy, that the spacing monitoring device comprises a control device; and that the first and/or the further vehicle comprises a pitch angle detection apparatus that detects a pitch angle of the respective vehicle, at least one pitch angle detection apparatus transferring to the control device a pitch angle signal that contains information regarding the pitch angle of at least one vehicle; the control device generating the spacing signal in accordance with the detection state of the at least one sensor arrangement and in accordance with the pitch angle signal of the at least one pitch angle detection apparatus.

The statements made above regarding the yaw angle detection apparatus apply correspondingly, mutatis mutandis, to the pitch angle detection apparatus, with the stipulation that the "yaw angle" is to be considered to be replaced by the "pitch angle," and a "yaw axis" correspondingly by a "pitch axis."

Specifically when the embodiment, indicated above as preferred, having a plurality of sensor arrangements is implemented on the target vehicle, the sensor arrangements being arranged on the target vehicle with a spacing from one another in a circumferential direction around the yaw axis of the source vehicle, upon a change in the relative yaw angle of the two vehicles of the working combination, the detection states of at least two sensor arrangements change counter-directionally when the two sensor arrangements are arranged on different sides of a vertical longitudinal plane, parallel to the roll axis and the yaw axis of the target vehicle, through the beam source. Upon a change in the relative pitch angle, conversely, the detection states of such sensor arrangements change in the same direction. Although it has already been stated above that it can be sufficient in principle for the yaw angle signal and/or the pitch angle signal to contain only information regarding respectively a yaw angle or a pitch angle of the vehicle carrying the respective detection apparatus, for maximally comprehensive and accurate avoidance of detection errors it is advantageous if the yaw angle signal contains information regarding the relative yaw angle between the source vehicle and target vehicle, and/or if the pitch angle signal contains information regarding the relative pitch angle between the source vehicle and target vehicle.

Alternatively or in addition to the arrangement of at least two sensor arrangements on different sides of the aforesaid vertical longitudinal plane, a change in the detection state caused by a change in the relative yaw angle can also be distinguished from a change in detection state caused by a change in the relative pitch angle by way of at least two sensor arrangements, located substantially at the same roll axis position, that are arranged on the same side of the vertical longitudinal plane but at different spacings therefrom. With increasing spacing from the vertical longitudinal plane, a change in the relative yaw angle causes a change of increasing magnitude in the detection state. This does not apply, however, to a change in the relative pitch angle.

Advantageously, the spacing signal is used in order to keep the spacing between the vehicles of the working combination within the predetermined setpoint spacing value range during working operation. Within this setpoint spacing value range, working operation as intended is, as a rule, reliably possible. Provision can be made for that purpose that the spacing signal contains operating information for operating a drive engine and/or a vehicle brake of at least one of the vehicles.

The operating information can be information outputted to a vehicle operator of one of the vehicles, to decelerate or accelerate his or her vehicle or to leave the vehicle speed unchanged. The operating information can also, however, be direct control information for a vehicle control system in order to automatically (i.e. with no intervention by a human operator) decelerate or accelerate one of the vehicles and/or to establish a specific travel speed. The purpose of such open- or closed-loop control can be to keep the detection region of the sensor arrangement in a predetermined detection zone, or to return it thereinto if necessary. The detection zone is determined by a spacing interval corresponding to the predetermined setpoint spacing value range.

According to an advantageous refinement of the present invention, history information regarding the change in the detection states and/or regarding the time course of the detection states can be stored in a data storage apparatus. The data storage apparatus is interrogatable by a control device, preferably that of the spacing monitoring device. It is thus possible to output operating information, which serves to establish an operating state with a spacing of the vehicles of the working combination which is within the setpoint spacing value range, even when, for example, the sensor arrangement is outside the beam space because of an excessively large change in spacing. It is then possible to ascertain from the history information stored in the data storage apparatus, even without a detected signal at the sensor arrangement, the direction in which the detection region departed from the sensor arrangement. It can be ascertained from that direction whether one of the vehicles needs to be accelerated or decelerated in order to change the currently existing spacing to a spacing within the setpoint spacing value range.

Because the vehicles of a working combination do not operate independently of one another and because, for example, operating limits may exist which are to be complied with for successful working operation, it is advantageous if the vehicles of the working combination are in data communication with one another in at least one data transfer direction, preferably bidirectionally, by way of a data communication connection.

For example, one of the two vehicles can inform the respective other vehicle, via the data communication connection, that it has reached a limit working speed and cannot accelerate or decelerate further. This can be useful specifically for automated adjustment of the spacing the vehicles of a vehicle combination. For maximally defined management of the working combination in a working direction, it is furthermore advantageous if one vehicle from among the source vehicle and target vehicle, constituting a leader vehicle, defines a movement speed of the working combination in the working direction, and that the spacing signal is outputted to the respective other vehicle from among the source vehicle and target vehicle, constituting a follower vehicle. As a rule, the leader vehicle or master vehicle is that vehicle for which a change in operating parameters will have a more critical effect on the working result than a change in operating parameters of the respective other vehicle, which is then consequently a follower vehicle.

In the interest of further precision in indicating the attainment of limit operating parameters, provision can then be made that the follower vehicle is embodied to indicate to the leader vehicle, during working operation as intended, that an operating parameter has exceeded a predetermined warning threshold and approached its limit parameter value, and/or has reached its limit parameter value.

In a preferred embodiment, the first vehicle is an earth working machine that applies a material onto the substrate, and the further vehicle is a supply vehicle that transfers material intended for application to the first vehicle. The earth working machine applying the substrate, usually a road paver, is the leader vehicle, since changes in operating parameters of that vehicle have a direct influence on the quality of the substrate that is generated, for example smoothness or freedom from elevations and depressions. Because changes in operating parameters of the supply vehicle have less-critical effects on the working result of the working combination, the supply vehicle is then the follower vehicle. The supply vehicle can be a loader or a transport truck, or can be a recycler that, directly in front of a road paver constituting the leader vehicle, removes substrate, prepares removed material, and transfers it to the road paver to be reapplied.

A basic rule that can be employed is that when considering the overall desired working result of the working combination, the earth working machine that is designed to directly physically produce the working result is preferably the leader vehicle, and that even when the further vehicle of the working combination is also an earth working machine, that earth working machine is the follower vehicle if it contributes not directly but only indirectly to the working result of the working combination.

The aforementioned control device of the spacing monitoring device is preferably arranged on the follower vehicle, so that the spacing signal of the spacing monitoring device is present directly on the vehicle whose control system is intended to be influenced by the spacing signal. The leader vehicle can then operate with the operating parameters that are respectively optimal for the given working task, and the follower vehicle conforms to the leader vehicle.

In a preferred case, the spacing signal serves on the follower vehicle directly to control the speed of the follower vehicle, so that a predefined setpoint spacing between the vehicles can be kept exactly as possible within the predefined setpoint spacing value range.

Because the spacing signal is ascertained based on the detection state of the sensor arrangement, the sensor arrangement is preferably also arranged on the follower vehicle, while the beam source is preferably arranged on the leader vehicle. Data communication between the leader vehicle and follower vehicle can be minimized in this case. Only when the follower vehicle, for example a recycler, has reached its maximum speed is it advantageous if the follower vehicle indicates that fact to the leader vehicle so that the latter does not further increase its speed even though that would be possible based on the fundamental circumstances of the respective construction site.

The source vehicle is therefore preferably the leader vehicle, and the target vehicle is preferably the follower vehicle.

It is to be clarified explicitly that the follower vehicle does not necessarily trail behind the leader vehicle. Specifically in the preferred example of a road paver constituting the earth working machine of the first vehicle, the follower vehicle as a rule will precede the leader vehicle in a working direction.

BRIEF DESCRIPTION OF THE SEVERAL VIEWS OF THE DRAWINGS

The present invention will be explained in further detail below with reference to the appended drawings, in which.

DETAILED DESCRIPTION

In FIGS. 1 to 6, an embodiment according to the present invention of a working combination of the present Application is labeled in general with the number 10. Working combination 10 encompasses a first vehicle 12 and a further vehicle 14. First vehicle 12 is, by way of example, a road paver; further vehicle 14 is a recycler. Both vehicles 12 and 14 are therefore earth working machines.

Working combination 10 moves in a working direction A that is oriented parallel to the drawing planes of FIGS. 1 to 4. Because vehicles 12 and 14 are ground-based vehicles, working direction A is also oriented parallel to substrate U on which vehicles 12 and 14 are supported.

Further vehicle 14, i.e. for example the recycler, removes material from the ground using a working device 16 that encompasses a milling drum, and processes removed substrate material by mixing in binders so that recycled substrate material 17 is conveyed via a conveyor belt 18 from further vehicle 14 into bunker 20 of first vehicle 12.

The material present in bunker 20 is applied by road paver 12 to produce a solid substrate layer.

Recycler 14, which precedes paver 12 in working direction A, operates destructively on the ground as described. Substrate U is thereby prepared for pavement application by paver 12. Paver 12 operates constructively, and directly creates the working result desired from working combination 10.

Because the substrate, in the application example, has locally different surface planes, substrate U that is present between the two vehicles comprises 12 and 14 in working direction A, and forms a uniform reference surface or reference plane for the two vehicles 12 and 14, is to be utilized as a reference substrate.

Figure 1:
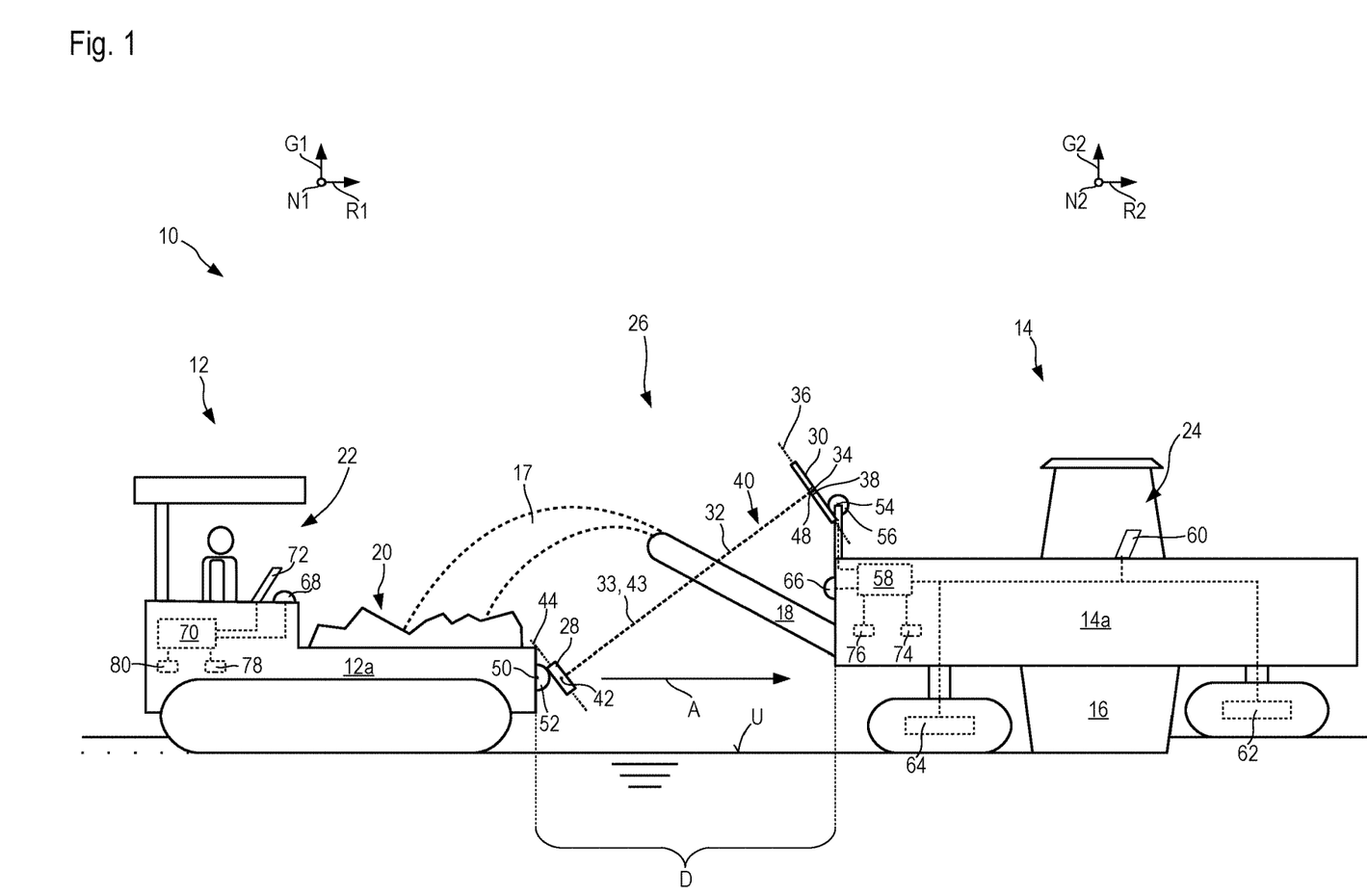
FIG. 1 is a schematic side view of a working combination of the present invention, with the two vehicles of the working combination at a reference spacing.

In the reference state shown in FIG. 1, vehicles 12 and 14 are at a spacing D from one another in working direction A.

Because paver 12 directly influences the working result of working combination 10, while changes in operating parameters of recycler 14 only indirectly influence the working result, in the present example paver 12, i.e. first vehicle 12, is a leader vehicle that substantially defines the speed of working combination 12. Recycler 14 is accordingly a follower vehicle, whose travel speed in working direction A is based, within predetermined limits, on the stipulations of leader vehicle 12.

An operator's platform 22 of paver 12 is occupied by an operator. An operating platform 24 of recycler 14 can be occupied by an operator and, for industrial safety reasons, usually is. As will be explained in further detail below, however, at least the advance speed of recycler 14 in working direction A can be controlled automatically as a function of the advance speed of paver 12 and of a vehicle spacing interval to be maintained between vehicles 12 and 14.

Vehicle spacing D is intended to be in a predetermined setpoint spacing value range within predefined limits so that, for example, recycled substrate material 17 ejected from conveyor belt 18 reliably reaches only bunker 20 of paver 12. The conveying device for conveying recycled substrate material 17 from recycler 14 to paver 12 can also be implemented by way of another conveying means differing from the conveyor-belt conveying system depicted merely schematically in FIGS. 1 to 6.

Working combination 10 comprises a spacing monitoring device 26 to monitor vehicle spacing D.

Said device encompasses a laser beam source 28 and two sensor arrangements 30 arranged with a spacing from one another along pitch axis N2 of recycler 14. Only the respective sensor arrangement 30 located closer to the viewer is depicted in FIGS. 1 to 4. Further sensor arrangement 30, located behind it, is concealed by the one depicted.

Laser beam source 28 emits a laser beam 32 that, in the reference state depicted in FIG. 1, reaches sensor arrangement 30 only in a central detection region 34.

Sensor arrangement 30 extends along a sensor axis 36 and comprises, successively along that sensor axis 36, a plurality of sensor elements sensitive to the light of laser beam 32. Only sensor element 38 located in detection region 34 is depicted by way of example in FIG. 1.

Figure 5:
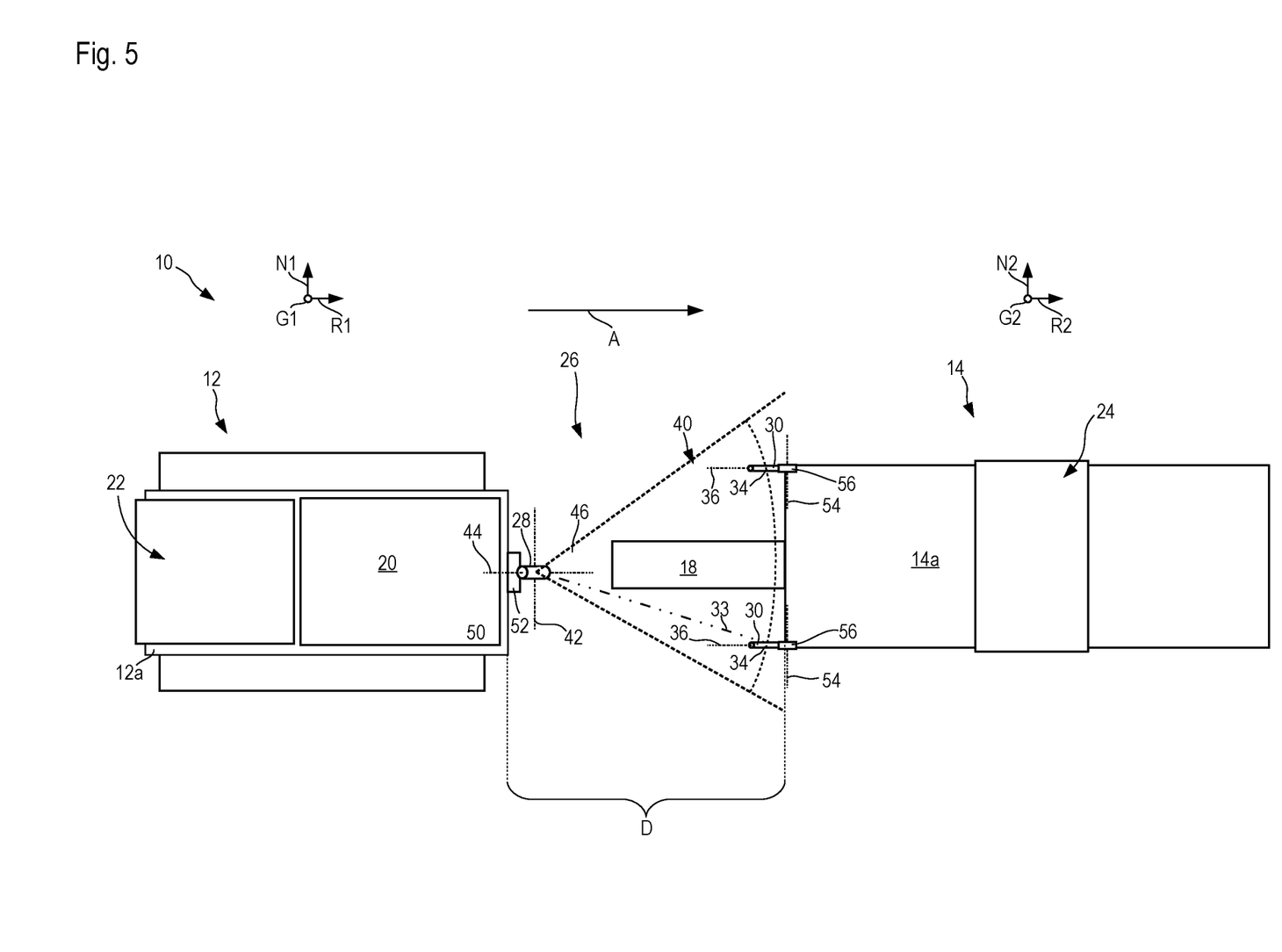
FIG. 5 is a schematic plan view of the working combination in the reference state of FIG. 1.

Laser beam source 28 either is a rotary laser, which can be occluded for industrial safety reasons in emission regions that are not needed, or is a source of an oscillating laser beam 32 that illuminates only a predetermined angular region (see second angular region 46 in FIG. 5).

Proceeding from laser beam source 28, only a beam space 40 is filled with laser beam 32; that space extends, around a first beam space axis 42 that is orthogonal to the drawing plane of FIGS. 1 to 4, over a very small first angular region 43 that corresponds substantially only to the thickness of laser beam 32. Around a second beam space axis 44, laser beam 32 sweeps over a second angular region 46 (see FIGS. 5 and 6) that is very large compared with first angular region 43 around first beam space axis 42. Second angular region 46 is sufficiently large that the two sensor arrangements 30 of recycler 14 are reliably reached by laser beam 32 over the entire setpoint spacing value range of vehicle spacing D. Here as well, the depiction of second angular region 46 in FIGS. 5 and 6 is merely schematic.

First beam space axis 42 is parallel to pitch axis N1 of paver 12. Second beam space axis 44 is parallel to a plane spanned by yaw axis G1 and roll axis R1 of paver 12.

As depicted in FIG. 1, beam space 40 around first beam space axis 42 is inclined with respect to working direction A. Sensor axis 36 is also inclined with respect to an inclination axis 48 that is preferably parallel to first beam space axis 42. Sensor axis 36 proceeds parallel to a plane spanned by yaw axis G2 and roll axis R2 of recycler 14. The inclination of sensor arrangement 30 around inclination axis 48 is preferably such that in the reference state shown in FIG. 1, sensor axis 36 is oriented orthogonally to laser beam 32 that strikes sensor arrangement 30. Because laser beam 32 is emitted orthogonally to second beam space axis 44 in the preferred exemplifying embodiment depicted, sensor axis 36 and second beam space axis 44 are thus preferably parallel to one another in the exemplifying embodiment. This arrangement results in high sensitivity for sensor arrangement 30 with respect to a change in vehicle spacing D, along with a large sensing region.

Figure 2:
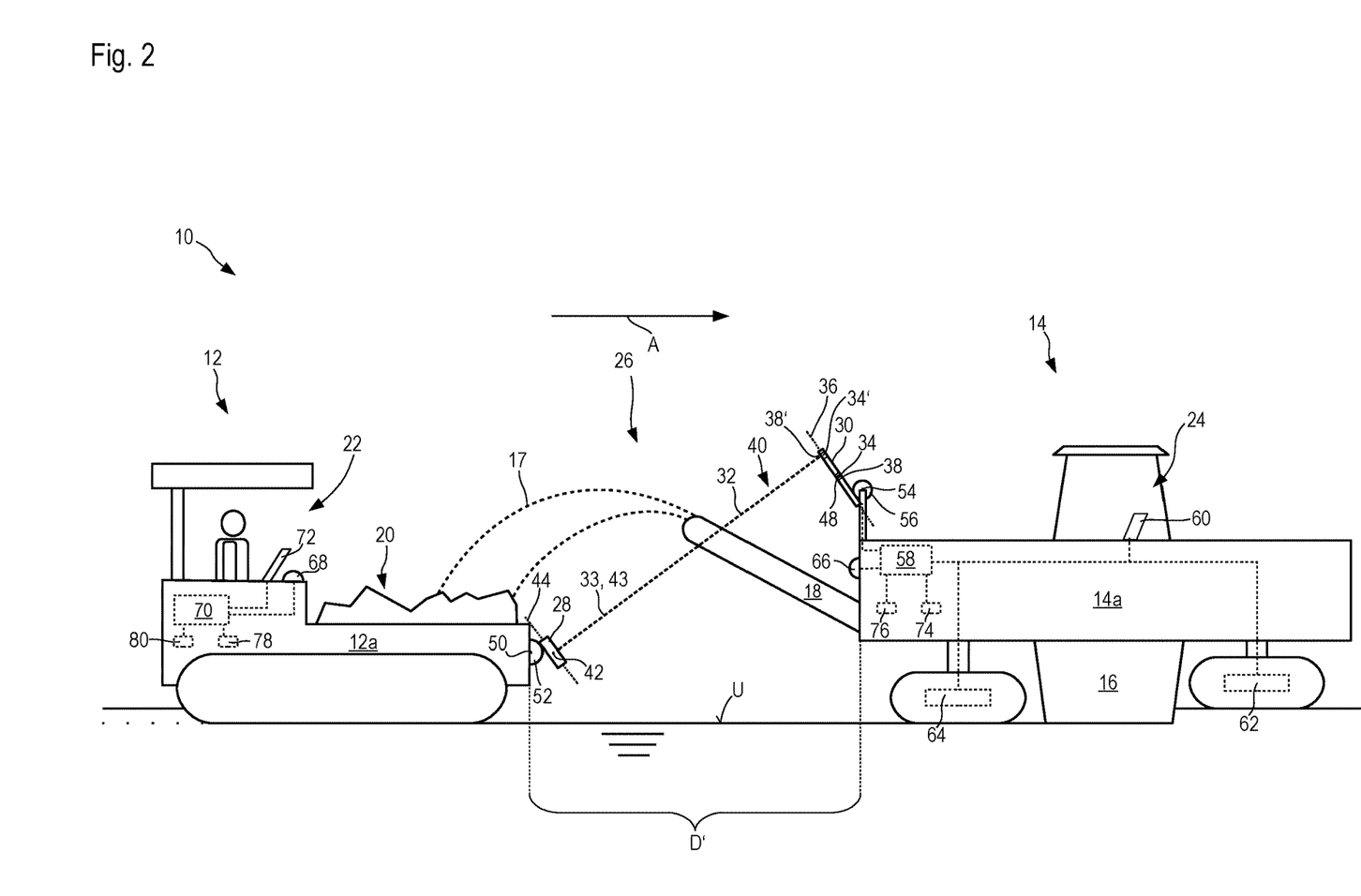
FIG. 2 is the schematic side view of the working combination of FIG. 1, with an increased spacing between the two vehicles of the working combination.
Figure 3:
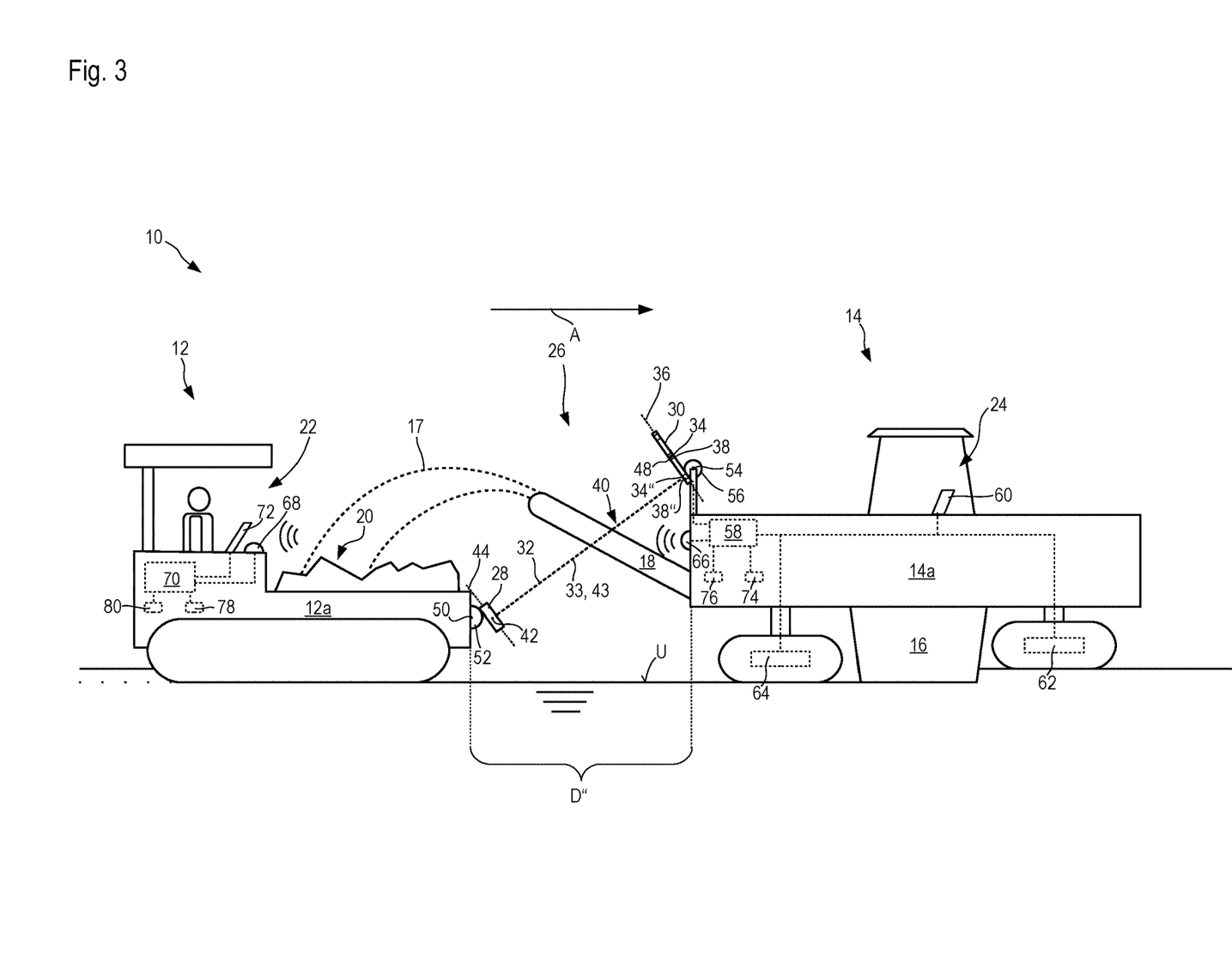
FIG. 3 is the schematic side view of the working combination of FIG. 1, with a shortened spacing between the vehicles of the working combination.

FIG. 5 shows a connecting line 33 between laser light source 28 and detection region 34 of sensor arrangement 30 (depicted in FIG. 1). The depiction of connecting line 33 in the side views of FIGS. 1 to 3 is identical to the depiction of first angular region 43, or the depiction of laser beam 32.

In the reference state, sensor axis 36 preferably proceeds parallel to an intersection line of a plane orthogonal to connecting line 33 on the one hand and parallel to a plane containing roll axis R2 and yaw axis G2 of further vehicle 14 on the other hand. The sensor axis then proceeds orthogonally to connecting line 33, and is nevertheless inclined only around inclination axis 48 that is parallel to pitch axis N2 of further vehicle 14.

In order to simplify the setup of spacing monitoring device 26, laser beam source 28 on machine body 12a of paver 12 is displaceable around a paver-side adjustment axis 50 by means of a preferably electric-motor-based actuator 52. In the present example, paver-side adjustment axis 50 is parallel to first beam space axis 42 and is furthermore parallel to pitch axis N1 of first vehicle (paver) 12.

For the setup of sensor arrangement 30, the latter is likewise adjustable around a recycler-side adjustment axis 54, by means of a preferably electric-motor-based actuator 56, in terms of its orientation relative to vehicle body 14a of further vehicle 14. Recycler-side adjustment axis 54 is parallel to pitch axis N2 of recycler 14, and also parallel to inclination axis 48 of sensor arrangement 30.

A Cartesian triple coordinate diagram having the respective vehicle-related coordinate axes—roll axis R, pitch axis N, and yaw axis G—is shown in order to illustrate the orientation of first vehicle 12 and further vehicle 14 in the reference state. The axes of first vehicle 12 additionally include the number 1, and the corresponding coordinate axes of second vehicle 14 additionally include the number 2. Yaw axes G1 and G2 respectively of first and second vehicle 12 and 14 are parallel to one another, as are pitch axes N1 and N2 and roll axes R1 and R2.

Spacing monitoring device 26 comprises a control device 58 that is arranged by way of example on recycler 14, which is not only a follower vehicle but also, because of the arrangement of sensor arrangement 30 thereon, a target vehicle as well.

Depending on where laser beam 32 strikes sensor arrangement 30, control device 58 can output a spacing signal having information regarding vehicle spacing D. In a simple case, the spacing signal can be displayed, via a data line, as operating information on a display apparatus 60 on operator's platform 24 of recycler 14. With display apparatus 60, for example, a machine operator on operator's platform 24 can be informed that he or she is to accelerate recycler 14 in working direction A if vehicle spacing D is too small, decelerate it if vehicle spacing D is too large, or leave the vehicle speed unchanged if vehicle spacing D is correct.

Alternatively, control device 58 can also output the spacing signal to the drive motors 62 and 64 of recycler 14 and accelerate or decelerate them, or continue to operate them at the existing drive speed, as a function of the detection state of sensor arrangement 30. Outputting the spacing signal to drive motors 62 and 64 is equivalent to outputting to an motor control apparatus or central control apparatus that is embodied and provided separately from control device 58 and controls drive motors 62 and 64. Control device 58 can also be the central control apparatus of recycler 14.

The simplest type of spacing monitoring by way of spacing monitoring device 26 functions in this fashion. It is particularly advantageous that this type of spacing monitoring of vehicle spacing D functions without any data communication between first vehicle 12 and second vehicle 14. Spacing control or regulation can thus be implemented exclusively in the follower vehicle (here, recycler 14) without requiring for that purpose any acknowledgment to the leader vehicle (here, paver 12).

It is sufficient to manipulate the speed of recycler 14 in working direction A in such a way that detection region 34 on sensor arrangement 30 is located in a predetermined sensor-axial detection zone.

Such communication is nevertheless not to be ruled out.

Although working combination 10 having spacing monitoring device 26 functions in the manner already described above, its functionality can nevertheless be expanded. Follower and target vehicle 14 can, for example, comprise a transmit/receive unit 66 that can likewise be controllable via control device 58. Transmit/receive device 66 serves for data exchange with a transmit/receive unit 68 on source and leader vehicle 12.

A control device 70, by way of which the paver-side transmit/receive device 68 can be controlled, can likewise be provided on paver 12. Control device 70 of paver 12 can furthermore comprise a data output unit 72 with which data can be outputted, in particular displayed, to an operator on operator's platform 22.

The two vehicles 12 and 14 can exchange data between one another using transmit/receive units 66 and 68. The data communication can be unidirectional but is preferably bidirectional. If it is unidirectional, communication preferably occurs from follower vehicle 14 to leader vehicle 12.

To further enhance spacing monitoring accuracy, recycler 14 can comprise a yaw angle sensor 74 and a pitch angle sensor 76. The two sensors are connected data-transferringly to control device 58 of paver 14.

Paver 12, constituting the leader vehicle, can also comprise a yaw angle sensor 78 and a pitch angle sensor 80 that are likewise each connected data-transferringly to their control device 70.

Working combination 10 of FIG. 1 is depicted in FIG. 2 with an increased vehicle spacing D'. It is evident that detection region 34' on sensor arrangement 30, in which region laser beam 32 of source vehicle 12 is detected, has shifted from the originally central detection region 34 to the upper (with respect to sensor axis 36) longitudinal end. The laser light thus no longer irradiates into central sensor element 38, but only into an upper end-located sensor element 38'.

Without any communication between the two vehicles 12 and 14, control unit 58 can thus recognize, based solely on the relative displacement of detection region 34 to 34', that vehicle spacing D has changed from the reference spacing of FIG. 1. It is furthermore possible to store, in a data memory of control device 58, the fact that a displacement of detection region 34 from a sensor-axially central detection region 34 to an upper end-located detection region 34' signifies an increase in the vehicle spacing. Control device 58 can correspondingly indicate, on display apparatus 60 on operator's platform 24 of recycler 14, that the speed of follower vehicle 14 is to be decreased, and/or can directly control drive motors 62 and 64 so as to slow down the travel speed of recycler 14 in working direction A.

FIG. 3 depicts working combination 10 of FIG. 1 with a shortened vehicle spacing D". Detection region 34" at which laser beam 32 is received on sensor arrangement 30 is now located at the lower sensor-axial end of sensor arrangement 30. A lower end-located sensor element 38" now receives the laser light, while the remaining sensor elements of sensor arrangement 30 are not reached by the laser light of laser beam source 28 and are located in a dark region.

Analogously to the explanation above regarding FIG. 2, control device 58 recognizes from the location of detection region 34" that spacing D" between vehicles 12 and 14 has decreased or has in fact reached a lower limit value. Control device 58 can correspondingly output to display apparatus 60 on operator's platform 24 a signal that prompts a vehicle operator on operator's platform 24 to accelerate recycler 14 in working direction A, and/or control device 58 can control drive motors 62 and 64 of recycler 14 so as to increase the speed.

When recycler 14 has already reached its maximum travel speed in working direction A, which is also the advance speed of working device 16, a further acceleration of recycler 14 is technically no longer possible. In this case control device 58 transfers, via transmit/receive unit 66, a corresponding signal to transmit/receive device 68 of paver 12, where control device 70 therein indicates to the machine operator on operator's platform 22, on data output unit 72, that paver 12 must not pave any faster or should in fact decrease its working speed in working direction A. Because recycler 14 is a follower vehicle and governs its speed in working direction A in accordance with the speed of paver 12 in working direction A, once recycler 14 has reached its maximum speed in working direction A and spacing D between vehicles 12 and 14 becomes even shorter, that spacing can be increased again only by way of control interventions at supply vehicle 12.

Figure 4:
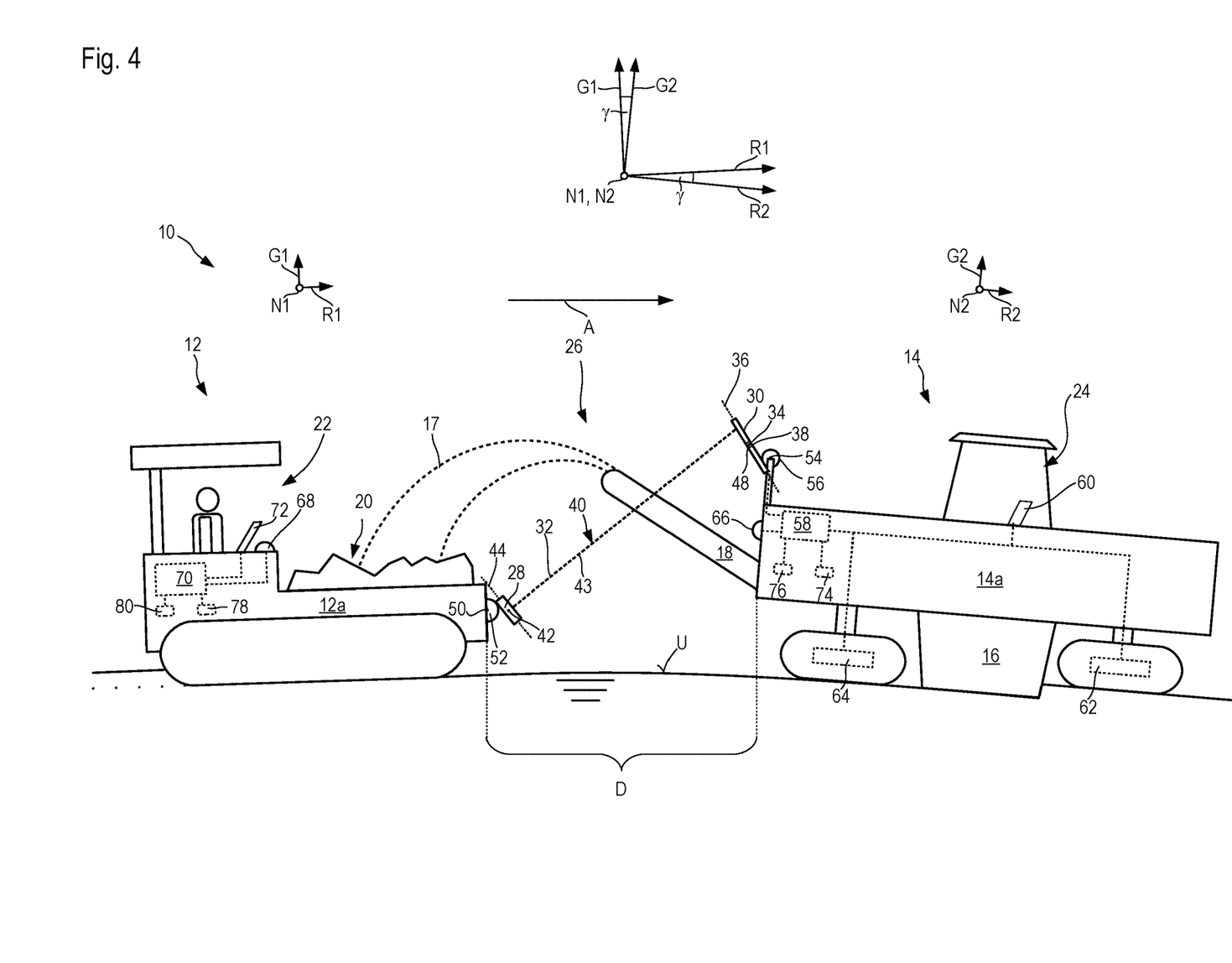
FIG. 4 is the schematic side view of FIG. 1 with a convexly curved substrate.

FIG. 4 depicts working combination 12 of FIG. 1 traveling over an elevation in the terrain. Substrate U is curved around an axis of curvature orthogonal to the drawing plane of FIG. 4.

The depiction of FIG. 4 shows that the change in the detection state of sensor arrangement 36 corresponds to an increase in vehicle spacing D, even though vehicle spacing D has not in fact changed.

A superimposition, depicted at the top center of FIG. 4, of the two vehicle-specific coordinate systems shows that pitch axes N1 and N2 of vehicles 12 and 14 are still parallel to one another, but the yaw axes and roll axes are arranged with a mutual rotation relative to one another, through an angle γ, around a rotation axis parallel respectively to the yaw axis and to the axis of curvature.

By means of pitch angle sensor 76, control device 58 on recycler 14 can detect the fact that the pitch angle of recycler 14 has changed in an absolute coordinate system. Based on the travel speed, known to control device 58, of recycler 14 in working direction A, control device 58 can thus ascertain when paver 12 will also experience the same change in orientation around its pitch axis N1. Control device 58 can thus recognize, based on a pitch angle signal from pitch angle sensor 76, that the change in the detection state at sensor arrangement 30 results not from a change in vehicle spacing D, but instead from a change in the relative orientation of the two vehicles 12 and 14 around a change axis parallel to the pitch axis; control device 58 can predict, by time measurement and by measuring the speed of recycler 14, when the coordinate systems of the two vehicles 12 and 14 will once again exhibit three spatial axes that are parallel to one another. Control device 58 of recycler 14 can thus assess by itself, without data exchange with paver 12, whether a displacement of detection region 34 along sensor axis 36 is attributable to a change in spacing or to a terrain feature. This is based on the fact that the two vehicles 12 and 14 pass in succession along the same route with a time offset.

Pitch angle sensor 80 on paver 12 can, however, also be additionally utilized, its pitch angle signal being capable of being transferred via transmit/receive unit 68 to transmit/receive unit 66 of recycler 14. From the pitch angle information of the two vehicles 12 and 14, control device 58 can calculate a relative pitch angle of the two vehicles 12 and 14 with respect to one another, and thereby ascertain directly whether the two coordinate systems are or are not rotated relative to one another around their respective pitch axes N1 and N2. An evaluation of the detection result of sensor arrangement 30 can thus be made with even greater accuracy.

FIG. 5 depicts working combination 10 of FIG. 1 in a plan view from above. What is shown here is second sensor arrangement 30, although it corresponds entirely to sensor arrangement 30 that has previously been explained. Components and component portions that are identical and functionally identical to those in sensor arrangement 30 that has already been explained, i.e. lower sensor arrangement 30 in FIG. 5, are also associated with the second, upper sensor arrangement in FIGS. 5 and 6. The explanations provided for sensor arrangement 30 apply to both sensor arrangements 30.

A dashed sector line indicates detection regions 34 on the two sensor arrangements 30 in a context of straight-ahead travel.

Because a milling drum in recycler 14 as a rule is not arranged symmetrically in a pitch axis direction on the recycler, the two vehicles 12 and 14 can exhibit, in the direction of their respective roll axes R1 and R2 that are parallel in the reference state, an offset in a pitch axis direction.

FIG. 5 shows that in a context of straight-ahead travel, detection regions 34 are located approximately in the same sensor-axial region on the two sensor devices 30.

FIG. 6 depicts, by way of example, the beginning of a turning maneuver in a right-hand direction by the working combination. Recycler 14 has already steered into the right-hand turn; paver 12 has not yet done so. The detection regions of the two sensor arrangements 30 have accordingly shifted along the respective sensor axes 36, with no change in the vehicle spacing between vehicles 12 and 14. Because of the inclination of beam space 40 around first beam space axis 42 that is parallel to pitch axis N1 of paver 12, the displacement occurs counter-directionally when the yaw angles of vehicles 12 and 14 are different. In the example depicted, detection region 34 of sensor 30 at the top in FIG. 6 has traveled, proceeding from the state of FIG. 5, toward the upper longitudinal end of sensor arrangement 30, i.e. toward detection region 34' of FIG. 2. Detection region 34 of sensor arrangement 30 at the bottom in FIG. 6 has likewise traveled, proceeding from the state of FIG. 5, toward the lower longitudinal end of that sensor arrangement 30, i.e. toward detection region 34" of FIG. 3.

There can be, in principle, two reasons for a detection state of this kind: on the one hand a turning maneuver shown in FIG. 6, and on the other hand a terrain feature such that the two vehicles 12 and 14 are rotated relative to one another around an axis that is parallel to their two (initially parallel) roll axes R1, R2.

Thanks to yaw angle sensor 74 in recycler 14, however, control device 58 can ascertain, based on the yaw angle signal supplied thereby, that the detection state that has changed with respect to that of FIG. 5 results from a change in the yaw angle of recycler 14 and not from a change in spacing or a rotation around the roll axis. Instead of or in addition to a respective yaw angle sensor 74, 78, a roll angle sensor can be provided on one or both of vehicles 12 and 14. But because a turning maneuver represents a substantially more frequent operating situation than driving around a path that is twisted in a working direction, provision of a yaw angle sensor is preferred.

Instead of yaw angle sensors and roll angle sensors, information that is equivalent in terms of information content can alternatively or additionally be obtained by detecting machine data over a common time period and evaluating it, for example by detecting steering angles, travel speed and time, and/or distance traveled or the position of individual lifting columns, from which the spacing of the respective vehicle body relative to the propelling unit connected to the lifting column, and thus to the supporting surface of the ground area on which the respective propelling unit is supported, can be ascertained.

If only one sensor arrangement 30 were arranged on recycler 14, all that would be detectable by control device 58 at the beginning of a turning maneuver would be a change in the detection state, which, without additional information, would be indistinguishable from a change in spacing. As a result of the second sensor arrangement at a distance along pitch axis N2 from the first, however, on different sides of a plane that is parallel to the roll axis and the yaw axis of recycler 14 and passes through laser beam source 28 in the reference state of working combination 10, the above-described counter-directionality of the change in the detection state in the context of a turning maneuver can be produced and the turning maneuver can thus be recognized at sensor arrangements 30. The turning maneuver can be recognized even more accurately by way of additional information from yaw angle sensor 74.

As already explained above in connection with traveling over a terrain elevation (see FIG. 4), here as well yaw angle information from the paver-side yaw angle sensor 78 can be transferred from paver 12 to recycler 14 and converted there by control device 58, together with the yaw angle information of yaw angle sensor 74, into relative yaw angle information for the two vehicles 12 and 14 relative to one another. This offers the most accurate capability for assessing the detection state of the at least one sensor arrangement 30 in terms of a change in vehicle spacing D.

What is claimed is:

1. A system for monitoring a working combination comprising a self-propelled earth working machine constituting a first vehicle and at least one further self-propelled vehicle, wherein the first vehicle and the at least one further self-propelled vehicle are embodied during a working operation to move one behind another in a common working direction with a setpoint spacing that is within a predetermined setpoint spacing value range, the system comprising:
   a beam source carried by a source vehicle from among the first vehicle and the at least one further self-propelled vehicle, wherein the beam source is configured to emit electromagnetic radiation;
   a sensor arrangement extending along a sensor axis and arranged on a target vehicle as a respective other vehicle from among the first vehicle and the at least one further self-propelled vehicle, the sensor arrangement being sensitive to the electromagnetic radiation of the beam source;
   wherein when the working combination is in a predetermined reference state, with the first vehicle and the at least one further self-propelled vehicle having a predetermined reference spacing from one another,
   the beam source radiates toward the target vehicle an electromagnetic radiation directed in such a way that the electromagnetic radiation for spacing monitoring is present only in a beam space that extends over a first angular region around a first beam space axis and over a second angular region around a second beam space axis that encloses an angle with the first beam space axis,
   the second angular region is of equal magnitude to, or of greater magnitude than, the first angular region, and the beam space is inclined around the first beam space axis with reference to the common working direction;
   wherein when the working combination is in the predetermined reference state, a predetermined sensor-axial reference detection region on the sensor arrangement is irradiated by the beam source,
   the sensor axis being arranged with an inclination around an inclination axis parallel to the first beam space axis, relative to a connecting line between the sensor-axial reference detection region and the beam source, wherein a change in the vehicle spacing results in a change, along the sensor axis, in the position of the detection region on the sensor arrangement which is irradiated by the beam source, and thus in a change in the detection state of the sensor arrangement; and
   a control device configured to, based on the detection state, output a spacing signal that contains information regarding the vehicle spacing.

2. The system of claim 1, wherein:
   the target vehicle comprises at least two sensor arrangements that extend along respective sensor axes,
   the sensor axes, when considering the working combination in the reference state, are each arranged with an inclination, relative to a connecting line between the sensor-axial reference detection region and the beam source, around an inclination axis parallel to the first beam space axis; and
   the at least two sensor arrangements are arranged with a spacing from one another in a circumferential direction around the second beam space axis.

3. The system of claim 1, wherein the beam source is a laser beam source that emits laser light as the electromagnetic radiation.

4. The system of claim 3, wherein the beam source emits a laser beam that oscillates or rotates around the second beam space axis.

5. The system of claim 1, wherein the first beam space axis is parallel to a pitch axis of the source vehicle.

6. The system of claim 1, wherein the second beam space axis is located in, or parallel to, a plane spanned by a yaw axis and a roll axis of the source vehicle.

7. The system of claim 6, wherein the sensor axis of at least one sensor arrangement has, in a Cartesian vehicle coordinate system made up of a roll axis, a pitch axis, and a yaw axis, a greater extent component parallel to the plane spanned by a yaw axis and a roll axis of the target vehicle than orthogonally thereto.

8. The system of claim 1, further comprising an actuator that is coupled motion-transferringly respectively to the beam source and to the sensor arrangement, wherein one or more of the beam source and the at least one sensor arrangement is or are received, on the respective vehicle carrying them, displaceably in actuator-based fashion relative to a respective vehicle body, around an adjustment axis parallel to the first beam space axis.

9. The system of claim 1, wherein:
   one or more of the first vehicle and the further self-propelled vehicle comprises a yaw angle detection apparatus that detects a yaw angle of the respective vehicle, at least one yaw angle detection apparatus transferring to the control device a yaw angle signal that contains information regarding the yaw angle of at least one vehicle;
   the control device configured to generate the spacing signal in accordance with the detection state of the at least one sensor arrangement and in accordance with the yaw angle signal of the at least one yaw angle detection apparatus.

10. The system of claim 9, wherein the yaw angle signal contains information regarding a relative yaw angle between the source and the target vehicle.

11. The system of claim 1, wherein:
   one or more of the first vehicle and the further self-propelled vehicle comprises a pitch angle detection apparatus that detects a pitch angle of the respective vehicle, at least one pitch angle detection apparatus transferring to the control device a pitch angle signal that contains information regarding the pitch angle of at least one vehicle;
   the control device configured to generate the spacing signal in accordance with the detection state of the at least one sensor arrangement and in accordance with the pitch angle signal of the at least one pitch angle detection apparatus.

12. The system of claim 11, wherein the pitch angle signal contains information regarding a relative pitch angle between the source and the target vehicle.

13. The system of claim 1, wherein the spacing signal contains operating information for operating one or more of a drive motor and a vehicle brake of at least one of the vehicles.

14. The system of claim 1, wherein the vehicles of the working combination are in data communication with one another in at least one data transfer direction by way of a data communication connection.

15. The system of claim 1, wherein:
one vehicle from among the source vehicle and target vehicle, constituting a leader vehicle, defines a movement speed in the working direction; and
the spacing signal is provided to the respective other vehicle from among the source vehicle and target vehicle, constituting a follower vehicle.

16. The system of claim 15, wherein the follower vehicle is configured to indicate to the leader vehicle, during a working operation, that an operating parameter has exceeded a predetermined warning threshold and reached or approached its limit parameter value.

17. The system of claim 15, wherein the first vehicle is an earth working machine that applies a material onto a substrate, and the further self-propelled vehicle is a supply vehicle that transfers material intended for application to the earth working machine, the earth working machine being the leader vehicle and the supply vehicle being the follower vehicle.

18. A method for monitoring a working combination comprising a self-propelled earth working machine, constituting a first vehicle and at least one further self-propelled vehicle, wherein the first vehicle and the at least one further self-propelled vehicle are embodied during a working operation to move one behind another in a common working direction with a setpoint spacing that is within a predetermined setpoint spacing value range, the method comprising:
providing a beam source to be carried by a source vehicle from among the first vehicle and the at least one further self-propelled vehicle;
providing a sensor arrangement extending along a sensor axis and arranged on a target vehicle as a respective other vehicle from among the first vehicle and the at least one further self-propelled vehicle, the sensor arrangement being sensitive to the electromagnetic radiation of the beam source;
when the working combination is in a predetermined reference state, with the first vehicle and the at least one further self-propelled vehicle having a predetermined reference spacing from one another,
radiating from the beam source toward the target vehicle an electromagnetic radiation directed in such a way that the electromagnetic radiation for spacing monitoring is present only in a beam space that extends over a first angular region around a first beam space axis and over a second angular region around a second beam space axis that encloses an angle with the first beam space axis,
the second angular region being of equal magnitude to, or of greater magnitude than, the first angular region,
the beam space being inclined around the first beam space axis with reference to the working direction,
wherein a predetermined sensor-axial reference detection region on the sensor arrangement is irradiated by the beam source, the sensor axis being arranged with an inclination around an inclination axis parallel to the first beam space axis, relative to a connecting line between the sensor-axial reference detection region and the beam source, wherein a change in the vehicle spacing results in a change, along the sensor axis, in the position of the detection region on the sensor arrangement which is irradiated by the beam source, and thus in a change in the sensor-axial reference detection state of the sensor arrangement; and based on the detection state, generating a spacing signal that contains information regarding the vehicle spacing.

19. The method of claim 18, further comprising:
detecting a yaw angle of one or more of the first vehicle and the further self-propelled vehicle; and
generating the spacing signal in accordance with the sensor-axial reference detection state of the at least one sensor arrangement and in accordance with the yaw angle of at least one vehicle.

20. The method of claim 18, further comprising:
detecting a pitch angle of one or more of the first vehicle and the further self-propelled vehicle; and generating the spacing signal in accordance with the sensor-axial reference detection state of the at least one sensor arrangement and in accordance with the pitch angle of at least one vehicle.

* * * * *